United States Patent [19]

Puryear et al.

[11] 4,451,012

[45] May 29, 1984

[54] FISHING LINE CONTROL DEVICE

[75] Inventors: John W. Puryear; Arthur D. Callan, both of Tulsa, Okla.

[73] Assignee: Brunswick Corporation, Skokie, Ill.

[21] Appl. No.: 345,876

[22] Filed: Feb. 4, 1982

Related U.S. Application Data

[62] Division of Ser. No. 112,917, Jan. 17, 1980, Pat. No. 4,362,763.

[51] Int. Cl.³ .............................................. A01K 89/01
[52] U.S. Cl. ................................. 242/84.2 A; 242/128
[58] Field of Search .................... 242/84.2 A, 84.2 R, 242/84.21 R, 84.21 A, 84.1 R, 128; 427/27

[56] References Cited

U.S. PATENT DOCUMENTS

| | | | |
|---|---|---|---|
| 2,687,855 | 8/1954 | Shakespeare | 242/84.21 R |
| 4,031,270 | 6/1977 | Barnes | 427/27 |
| 4,058,269 | 11/1977 | Nurmse | 242/84.2 R |
| 4,061,288 | 12/1977 | Karlsson et al. | 242/84.2 R |
| 4,156,510 | 5/1979 | Hull | 242/84.2 R |

*Primary Examiner*—Billy S. Taylor
*Attorney, Agent, or Firm*—John G. Heimovics

[57] ABSTRACT

This invention comprehends a spin casting style fishing reel that can sit on top a fishing rod or be suspended thereunder. The reel has a line spool with a flange that is positioned inside the spinner head. In order to prevent untensioned fishing line from getting caught underneath the spinner head, a rim on the edge of the flange has a plurality of flocked fibers thereon. The invention also comprehends a method of coating the flange rim with fibers.

10 Claims, 3 Drawing Figures

FISHING LINE CONTROL DEVICE

This is a division of application Ser. No. 112,917 filed Jan. 17, 1980 now U.S. Pat. No. 4,362,763.

BACKGROUND OF THE INVENTION

1. Field of the Invention

This invention relates to spin casting style fishing reels, and more particularly, relates to spin casting style fishing reels with line spools with forward flanges. In order to prevent untensioned fishing line from getting caught under the spinner head, a plurality of fibers are coated on the rim of the flange.

2. Background of the Prior Art

In U.S. Pat. No. 4,156,510, R. D. Hull described the known practice of covering the outer peripheries of flanges of fishing reel spools with a brush of fibers in the form of rings, for example, formed of a fine twisted wire containing a series of short fibers or bristles more or less in the manner of a highly miniaturized pipe cleaner. In very large reels, for example, where the spinner head is about three inches in diameter this method of keeping untensioned fishing line from getting caught underneath the spinner head has proved to be adequate although not completely satisfactory. However, in small reels, under two inches in diameter, and more importantly, miniature fishing reels wherein the diameter of the spool is one-and-a-half inches or less, the pipe cleaner has proved to be disastrous because so many fibers get water-soaked from reeling in wet fishing line that the pipe cleaner swells in size. When this occurs, the swollen, wet pipe cleaner fills the space that exists between the inside surface of the spinner head and the brush. This causes a major interference between the two parts and makes the fishing reel very hard to crank. Thus, with the trend toward small miniaturized fishing reels utilizing 2 to 6 pound test fishing line, a solution to make fishing reels easy to crank and yet keep the untensioned line from catching underneath the spinner head is needed. The pipe cleaner type brush provides too many fibers that are not perpendicular to the inside of the spinner head.

SUMMARY OF THE INVENTION

This invention relates to spin casting type fishing reels and comprehends a fishing reel spool that prevents untensioned fishing line from being caught underneath the spinner head and enables easy cranking of the fishing reel.

It is therefore an object of this invention to provide a fishing reel spool that has a rim on the spool flange that has fibers that project outwardly perpendicularly to the rim.

It is another object of this invention to provide such a fishing reel spool where the fibers are electrostatically deposited on the rim.

It is yet another object of this invention to provide a fishing reel spool in the miniaturized fishing reel range that has fibers projecting from the rim of the flange to protect the reel so that fishing line does not get underneath the spinner head.

It is yet another object of this invention to provide a method for electrostatically coating the fibers on the rim of the flange of the fishing reel spool.

The above and other and further objects and features will be more readily understood by reference to the following detailed description and accompanying drawings.

DESCRIPTION OF THE PREFERRED EMBODIMENTS

Figure 1:
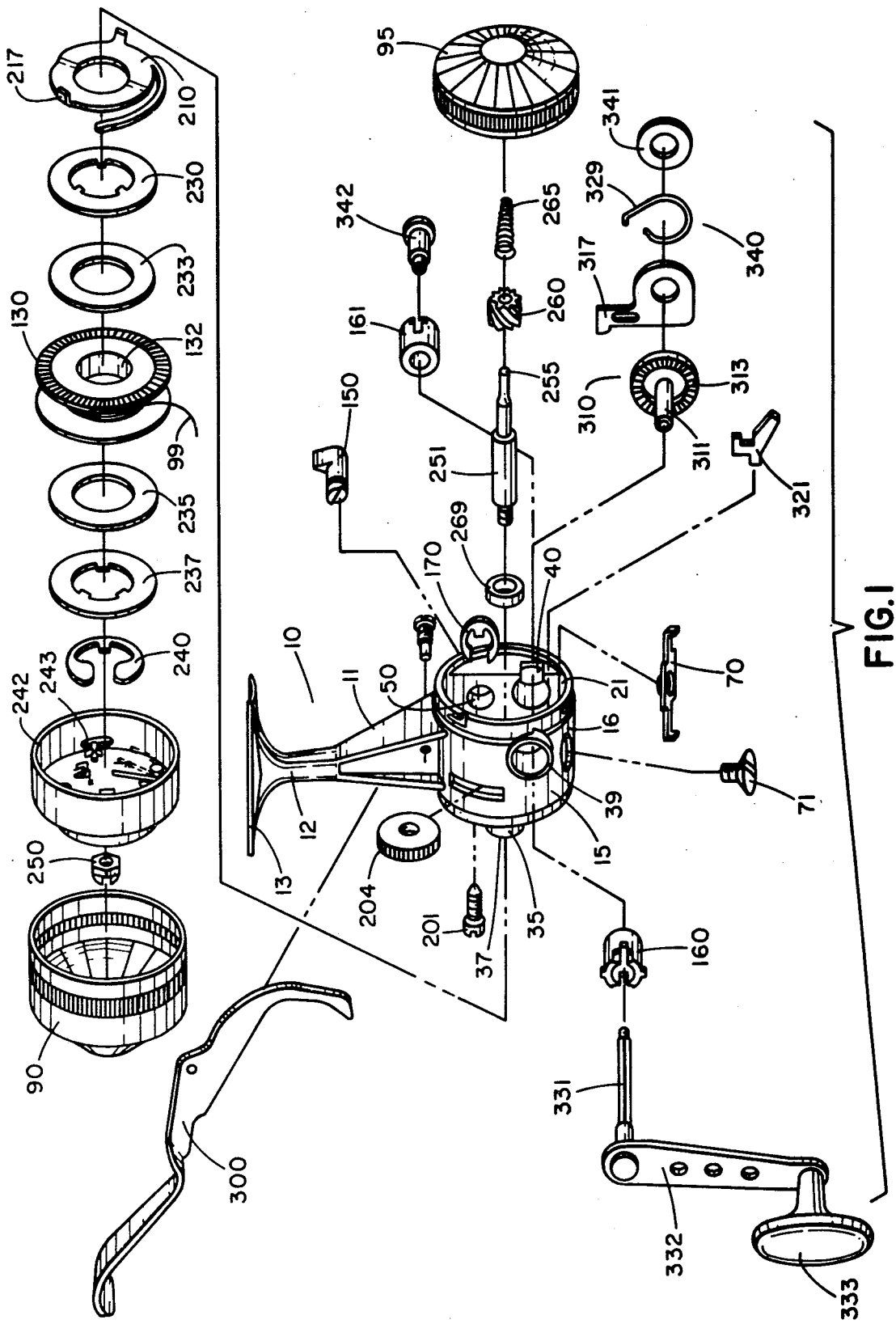
FIG. 1 is an exploded perspective view of the spin casting style fishing reel containing the invention described herein.

In a fishing reel 10 of the spin casting type containing the preferred embodiments of the invention, FIG. 1 generally depicts an exploded perspective view of such a reel. A housing 11 and spool 130, preferably made of a plastic material such as Acrylonitrile Butadyene Styrene (ABS) or glass filled polycarbonate, has a center deck plate 14 with forward and rear body portions 15 and 16. A central hub 35 projects forward of the deck plate 14 with a drag plate 210, back spool washer 230, back flat drag washer 233, spool assembly 130, front flat drag washer 235, front spool washer 237, all secured to the hub 35 by means of spool retainer clip 240 which fits into a groove (not shown in FIG. 1). A center shaft 251 is mounted in a hole (not shown in FIG. 1) in a hub 35 with the spinner head 242 mounted on the forward threaded end of the shaft 251 by means of nut 250. The spinner head 242 partially surrounds the forward flange of the spool 130 with fishing line 99 being wound thereon. A front cover 90 secured on the first forward body portion 15 has a front hole (not shown in FIG. 1) which acts as a fishing line guide as the line is cast from the reel and rewound after casting.

A clutch adjusting screw 201 is mounted in the interior 21 of the second body portion 16 with clutch wheel 204 mounted on screw 201. Tab 217 fits into the head of screw 201 and when the clutch wheel 204 is revolved upward toward stem 12 the screw 201 advances forward toward the spool retainer clip 240 increasing the clamping force on the spool 130 so that spool 130's ability to revolve relative to the hub 35 is decreased. When the wheel 204 is revolved away from the stem 12, the clamping force is decreased and the spool 130 is permitted to revolve relative to hub 35 thus creating the drag mechanism for the fishing reel 10. The center shaft 251 is slidably and rotatably mounted in bearing 269 which is mounted in the deck plate 14. Slidably mounted on center shaft 251 in the second body portion is pinion gear 260 and maintained in place by the center shaft spring 265.

A finger brake lever 300 is mounted on the housing 11 exterior the first body portion 15 and inside the second body portion 16 and being in operable contact with the distal end 255 of the shaft 251. When the exterior portion of the lever 300 is pulled upward toward the mounting foot 13, the center shaft 251 and the spinner head mounted thereon are pushed forward relative to the bearing 269 and the hub 35. The pickup pin mechanism 243 mounted on spinner head 242 cooperates with the cam mounted on the face of hub 35 to maintain the spinner head 242 in a forward position. In this forward position the fishing line 99 can be cast from the reel 10.

Crank assembly 310 is coupled with the anti-reverse assembly 340 which comprises a ratchet (on the back side of face gear 313 and not shown in FIG. 1), an anti-reverse drag arm 317, a drag spring 329 and spacer washer 341 all mounted on the hollow crank shaft 311. An anti-reverse pawl 321 is mounted in the deck plate 14 and received in between the back of the face gear 313 and drag arm 317 for engageable and disengageable contact with the ratchet. The crank assembly 310 is mounted in bearing supports 39 and 40 by sliding between slots in the supports 39 and 40. Crank bearings 160 and 161 mounted in supports 39 and 40 provide suitable bearings for the hollow shaft 311. A crank rod 331 is slip fitted into the hole in shaft 311 and keyed thereto. Crank rod nut 332 is secured to the threaded end to fasten rod 331 to the reel 10. The rod 331 is connected to the crank handle 332 and crank knob 333. The gear 313 is in engageable contact with pinion 260 so that when the crank handle 332 and knob 333 are rotated in a forward direction (toward the front cover) the crank shaft 251 rotates causing the spinner head 242 to rotate as well. This rotative motion disengages the pickup pin mechanism 243 from the hub 35 cam causing the spinner head 242 and shaft 251 to move rearward. This same motion causes the pickup pin of the mechanism 243 to extend outwardly beyond the spinner head 242 so that the fishing line 99 can be wound on the spool 130.

Anti-reverse actuator 150 is mounted in upper housing hole 50 and retained therein by retainer clip 170. The actuator 150 is in cooperative contact with the anti-reverse drag arm 317. In one position the actuator 150 disengages the anti-reverse assembly 340 permitting the crank rod 331 and the crank assembly to rotate in either the forward direction (upward toward the stem 12) or the reverse direction (downward from the stem 12 toward the back of the reel).

A back cover 95 is secured on the second back portion 16 to enclose the reel 10. Cover lock 70 is mounted within the housing 11 and is tightened in place by screw 71 clamping the covers 90 and 95 to the housing.

Figure 3:
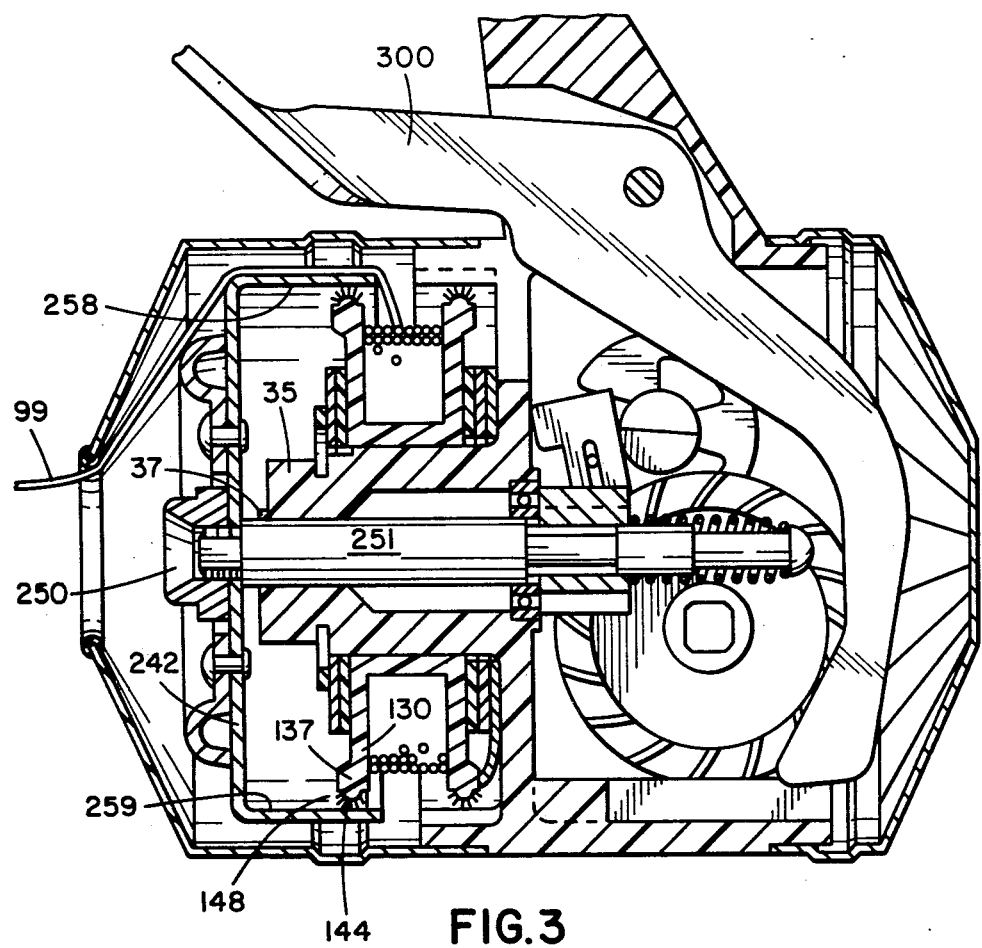
Figure 2:
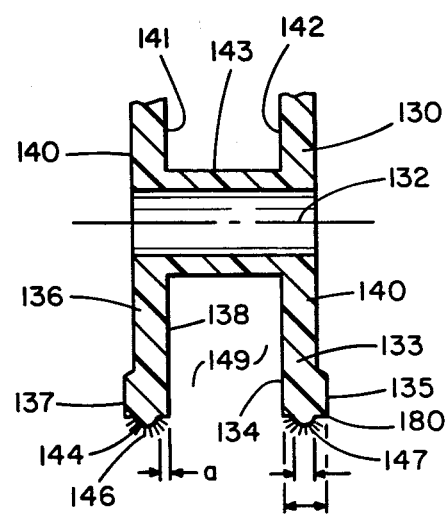
FIG. 2 is an enlarged partial cross-sectional view of a portion of the fishing reel spool described herein; and, FIG. 3 is a cross-sectional view of a side elevation of the fishing reel containing the invention described herein.

In a preferred embodiment of the invention as best seen in FIGS. 2 and 3, a spool 130 has a central section 143 with first and second end faces 141 and 142 which are covered by flanges 136 and 133 respectfully. the flanges 136 and 133 may be circular, if desired. Each flange 136 and 133 have inner surfaces 138 and 134 defining a line holding area 149 and also have outer surfaces 137 and 135. A center hole 132 extends through the center section 143 and the flanges 136 and 133. As noted in FIG. 2 the flanges 133 and 136 have a thickness "c".

On the exterior surface of the flanges 133 and 136 are rims 144 and 147. The width or thickness of the rims 144 and 147 has a dimension "b" which is smaller than the flanges 133 and 136; thus "b" is smaller than "c". Adhesive 180 covers both rims 144 and 147 and only the rims. Secured to the rims 144 and 147 are short fibers 146 which can be made of materials such as nylon or polytetrafluoroethylene. The fibers are preferably from ½ to 5 mils in diameter and up to 30 mils long. It has been found important that the fibers 146 do not extend into the area 149 from the rims 144 or 147. The fibers 146 must be shorter than the distance "a" so that they do not project beyond the inner surfaces 134 or 138 into the line spool area 149.

There is a narrow space 148 between the inner surface 259 of the rearwardly extending cylindrical side shirt 258 of the spinner head 242 and the rim 144. The forwardly extending fibers on rim 144 occupies this narrow annular space 148 so as to inhibit or prevent passage through the clearance space 148 of an untensioned coil of fishing line. The fibers on rim 144 also helps prevent water collected on the fishing line from getting into the space around hub 35 underneath the spinner head 242.

It has been found that by flocking fibers 146 on the rims 144 and 147 a much better fishing line barrier can be formed than that taught in the prior art.

In the preferred embodiment of making the fibers 146 stand up perpendicular to the rims 144 and 147, it has been found that the inner part of the rims 144 and 147 must be spaced from the inner surfaces 134 and 138 of the flanges such that any fibers that are perpendicular to the side of the circular rim do not extend into the inner surfaces. Although it has been found that only a forward flange is necessary for the spool of this invention, it is more convenient to have two flanges on the spool for ease of manufacture and so that the spools may be turned over when desired. In the method of coating the fibers on the rims of the spools, a plurality of spools are stacked together on a mandrel such that the rims of adjacent spools cannot touch each other since the rims have a configuration that is similar to that shown in FIG. 2 and are therefore spaced apart from the edge of the spool. The mandrel mounted spools are then coated with an adhesive; one such method is to roll the spools across a pad of adhesive so that the adhesive forms approximately a 6 mil thick coating only on the rim portions. By using known techniques, nylon or teflon fibers having a diameter ranging from about ½ mil to about 5 mils are electrostatically deposited on the rims as the spools are rotated underneath the depositing head. Most of the fibers adhere to the adhesive and project perpendicularly upwardly from the rim. The loose or not well adhered fibers are dislodged and removed by either vibrating the spools on the mandrel or by revolving the spools on the mandrel and subjecting them to a blast of air thereby removing the loose fibers. It has been found desirable to have at least 80% of the fibers that are adhered to the rim project perpendicularly up from the rim. (This has been successfully accomplished by the above described technique). The adhesive is then cured at room temperature in air or at an elevated temperature ranging from 140° Fahrenheit to 200° Fahrenheit depending upon the type of adhesive used. It has been found that after curing, the 6 mil wet adhesive shrinks to about 3 mils thick when dry.

Numerous tests have been made using spools made according to this invention and compared to the type of brush rings of the prior art. It has been found that spools made according to this invention create such fewer difficulties for fishermen in winding in the fishing line than that of the prior art. The prior art brush, made like a pipe cleaner, tends to hold water, swell up and rub against the inner surface 259 of the spinner head. This makes it very difficult to crank in the fishing line after casting. The simple upstanding flocked fibers of this invention do not have the limitations or disadvantages of the prior art pipe cleaners and thus provide much less friction between the spool and the spinner head.

It should be understood, of course, that the specific forms of the invention illustrated and described herein are intended to be representative only, as certain changes and modifications may be made without departing from the scope and teachings herein disclosed. Accordingly, reference should be made to the appended claims to ascertain the full scope of the invention.

What is claimed is:

1. A fishing reel spool comprising:
   (1) a center section having first and second end faces and a middle portion, a passageway through the middle portion and being concentric therewith, the passageway opening at the first and second faces;
   (2) a first cylindrical flange at the first face and extending radially outwardly from the middle portion, the flange having inner and outer surfaces, the flange having a preselected thickness in a direction parallel to the passageway through the spool;
   (3) a first rim at the periphery of the first flange projecting radially outwardly and having a thickness less than the thickness of the flange;
   (4) an adhesive coating covering the rim; and
   (5) a plurality of substantially short resilient fibers projecting substantially perpendicularly outwardly from the rim and secured thereto by the adhesive, said rim thickness being less than the thickness of the flange so that fibers lying substantially parallel to the passageway will not extend beyond the inner surface of the first flange.

2. The reel spool of claim 1 further including a second flange at the second face and extending radially outwardly from the middle portion, the flange having inner and outer surfaces and a preselected thickness, a second rim at the periphery at the second flange projecting radially outwardly and having a thickness less than the thickness of the flange.

3. The reel spool of claim 2 wherein a plurality of substantially short resilient fibers projecting substantially perpendicularly outwadly from the rim and secured thereto by the adhesive.

4. In a closed face spinning reel of the type comprising:
   (a) a forwardly projecting central hub;
   (b) a spool holding fishing line mounted on the hub;
   (c) a spinner head rotatably mounted and coaxially displaceable relative to the hub, the head having a rearwardly extending cylindrical side skirt having an inner surface surrounding part of the spool;
   (d) means for revolving and axially displacing the spinner head; the fishing reel spool comprising:
      (1) a center section having first and second radially extending flanges and a middle portion, a passageway through the middle portion and being concentric therewith;
      (2) at least one of the flanges having inner and outer surfaces and having a preselected thickness;
      (3) a first rim at the periphery of at least one flange projecting radially outwardly and having a thickness less than the thickness of the flange;
      (4) an adhesive coating covering the rim;
      (5) a plurality of substantially short resilient fibers projecting substantially perpendicularly outwardly from the rim and secured thereto by the adhesive the fibers being of a predetermined length such that the fibers projecting toward the plane of the inner surface of the flange have outer ends that are short of the plane of the inner surface; and
   (e) the rim on the flange being spaced from the inside of the spinner head skirt such that radially extending fibers on the rim wipe gently over the inside surface of the skirt preventing excess water from the fishing line from getting inbetween the spinner head and the spool.

5. The spool of claim 3 wherein the fibers have a diameter ranging from ½ mil to 5 mils.

6. The spool of claim 3 or 4 wherein the fibers have a length of approximately 30 mils.

7. The spool of claims 3 or 4 wherein at least 80 percent of the fibers secured to the rim project perpendicularly outwardly therefrom.

8. The spool of claim 3 or 4 wherein the spool is made from one or more of the following groups consisting of glass-filled polycarbonate, ABS and glass-filled ABS.

9. The spool of claims 3 or 4 wherein the outer surface of the flange has an undercut portion that is concentric with the passageway.

10. The spool of claim 3 or 4 wherein the rim has a semicircular cross sectional surface.

* * * * *